(12) United States Patent
Duch et al.

(10) Patent No.: US 9,272,573 B2
(45) Date of Patent: Mar. 1, 2016

(54) HUB-BEARING ASSEMBLY WITH SEALING DEVICE

(71) Applicants:Daniele Duch, San Gillio (IT); Fausto Morello, Sommariva del Bosco (IT); Andrea Serafini, Pinerolo TO (IT)

(72) Inventors: Daniele Duch, San Gillio (IT); Fausto Morello, Sommariva del Bosco (IT); Andrea Serafini, Pinerolo TO (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 13/937,375

(22) Filed: Jul. 9, 2013

(65) Prior Publication Data

US 2014/0010489 A1 Jan. 9, 2014

(30) Foreign Application Priority Data

Jul. 9, 2012 (IT) .............................. TO2012A0605

(51) Int. Cl.
| | | |
|---|---|---|
| *F16C 33/80* | (2006.01) | |
| *F16C 33/76* | (2006.01) | |
| *B60B 27/00* | (2006.01) | |
| *F16C 33/78* | (2006.01) | |
| *F16C 19/18* | (2006.01) | |

(52) U.S. Cl.
CPC ........... *B60B 27/0073* (2013.01); *F16C 33/782* (2013.01); *F16C 33/7886* (2013.01); *F16C 33/805* (2013.01); *F16C 19/186* (2013.01); *F16C 2326/02* (2013.01)

(58) Field of Classification Search
CPC .. F16C 19/186; F16C 33/782; F16C 33/7886; F16C 33/805; F16C 2326/02; B60B 27/0073; B60B 27/0005; B60B 27/001; B60B 2380/12; B60B 2380/14; B60B 2380/16

USPC .......... 384/477, 480, 484, 485, 486, 544, 589
See application file for complete search history.

(56) References Cited

U.S. PATENT DOCUMENTS

2007/0147718 A1* 6/2007 Takimoto ....................... 384/486
2007/0278748 A1* 12/2007 Matsui et al. .................. 277/549

FOREIGN PATENT DOCUMENTS

| EP | 0286151 A2 | 10/1988 |
|---|---|---|
| EP | 1128078 A2 | 8/2001 |
| EP | 1783405 A1 | 5/2007 |
| EP | 1803948 A1 | 7/2007 |
| JP | H0522852 U | 3/1993 |
| JP | 2006010055 A | 1/2006 |
| JP | 2008014384 A | 1/2008 |
| JP | 2009222183 A | 10/2009 |
| JP | 2010038346 A | 2/2010 |
| JP | 201060126 * | 3/2010 |
| JP | 2010065800 A | 3/2010 |
| JP | 2010180896 * | 8/2010 |
| JP | 2012081891 A | 4/2012 |
| WO | 2012019803 A1 | 2/2012 |

* cited by examiner

*Primary Examiner* — James Pilkington
(74) *Attorney, Agent, or Firm* — Bryan Peckjian; SKF USA Inc. Patent Dept.

(57) ABSTRACT

A hub-bearing assembly (10) is provided with an outer, stationary, ring (20), and an inner ring (30) with a flange (32) for mounting a wheel, and the flange (32) forms an annular relief (36) projecting in an axially inward direction and having an outer toroidal surface (42); a sealing device (50), mounted on the outer ring (20), has a non-contacting axial lip (61) which extends axially towards the flange (32) and has a free end portion (62) which creates a labyrinth seal with the outer toroidal surface (42) of the annular relief (36).

16 Claims, 1 Drawing Sheet

HUB-BEARING ASSEMBLY WITH SEALING DEVICE

CROSS-REFERENCE TO RELATED APPLICATIONS

This application claims priority to Italian patent application no. TO2012A000605 filed on Jul. 9, 2012, the contents of which are fully incorporated herein by reference.

FIELD OF THE INVENTION

The present invention relates to a hub-bearing assembly provided with a sealing device. More particularly, the assembly has an axis of rotation and is used for rotatably mount a vehicle wheel on a vehicle suspension

BACKGROUND OF THE INVENTION

Bearing assemblies are known, for example, from EP 0 286 151 A2, EP 1 128 078 A2, and EP 1 803 948 A1.

A hub-bearing assembly in which the sealing device is associated with a shield or slinger ring mounted on the rolling ring is described in WO 2012/019803 A1.

In general, the automotive industry needs to satisfy an ever-growing demand for reduction of fuel consumption and exhaust emissions.

The object of the present invention is to provide a hub-bearing assembly having a sealing device which, on the one hand, provides a high level of sealing, and, at the same time, achieves a reduction in the frictional torque caused by the sealing device when the rings of the assembly rotate relative to each other. It is also desirable to reduce manufacturing costs and the number of components in the assembly.

SUMMARY OF THE INVENTION

The aforesaid object and other objects and advantages are achieved, according to the invention, by a hub-bearing assembly having an axis of rotation (x) and having: a radially outer, stationary bearing ring (20); a radially inner bearing ring (30), which is rotatable about the axis of rotation and provides a flange (32) extending in a radially outer direction for mounting a wheel; a plurality of rolling elements (40) interposed between the outer (20) and inner (30) rings; a sealing device (50), mounted to the outer ring (20) and having a plurality of elastomeric sealing lips extending towards the inner ring (30); wherein the flange (32) forms an annular relief (36) projecting in an axially inner direction and providing a radially outer surface (42), facing in an opposite direction as of the axis of rotation (x), and one of the elastomeric sealing lips of the sealing device (50) is a non-contacting axial lip (61) which extends axially towards the flange (32) and provides a free end portion (62) which performs a labyrinth seal, without contact, with the radially outer surface (42) of the annular relief (36).

Preferred embodiments of the invention are defined in the dependent claims.

BRIEF DESCRIPTION OF THE DRAWINGS

Some preferred, but non-limiting, embodiments of a hub-bearing assembly according to the invention will now be described; reference is made to the attached drawings, in which.

DETAILED DESCRIPTION OF THE INVENTION

Figure 1:
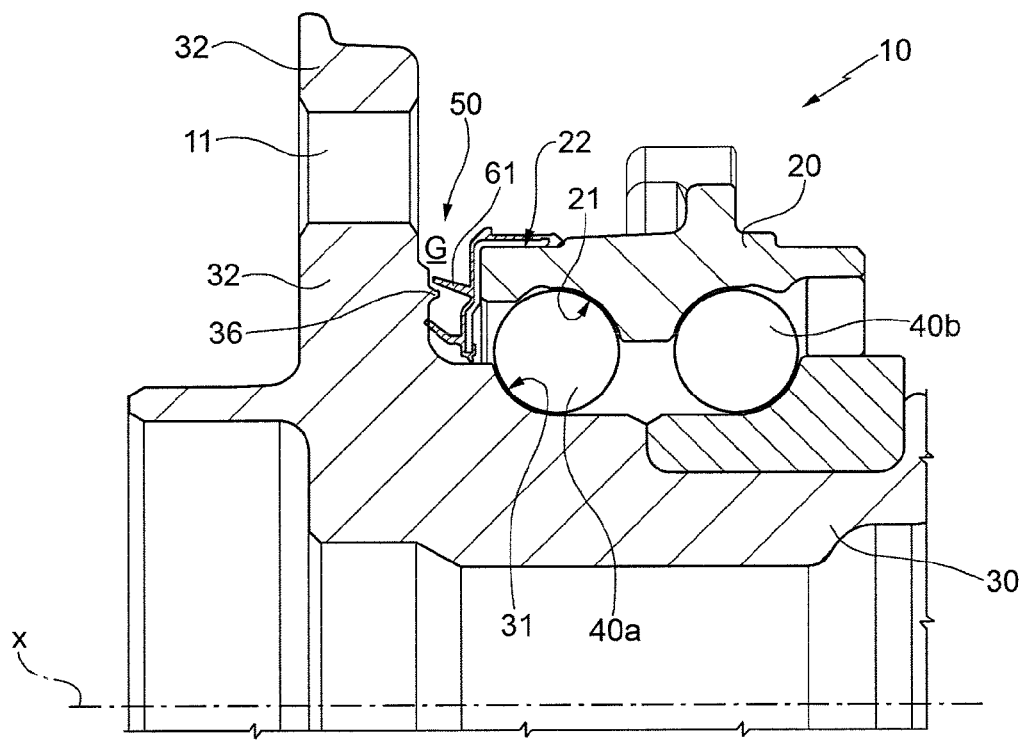
FIG. 1 is a partial view, in axial section, of a first embodiment of a hub-bearing assembly with a sealing device.
Figure 2:
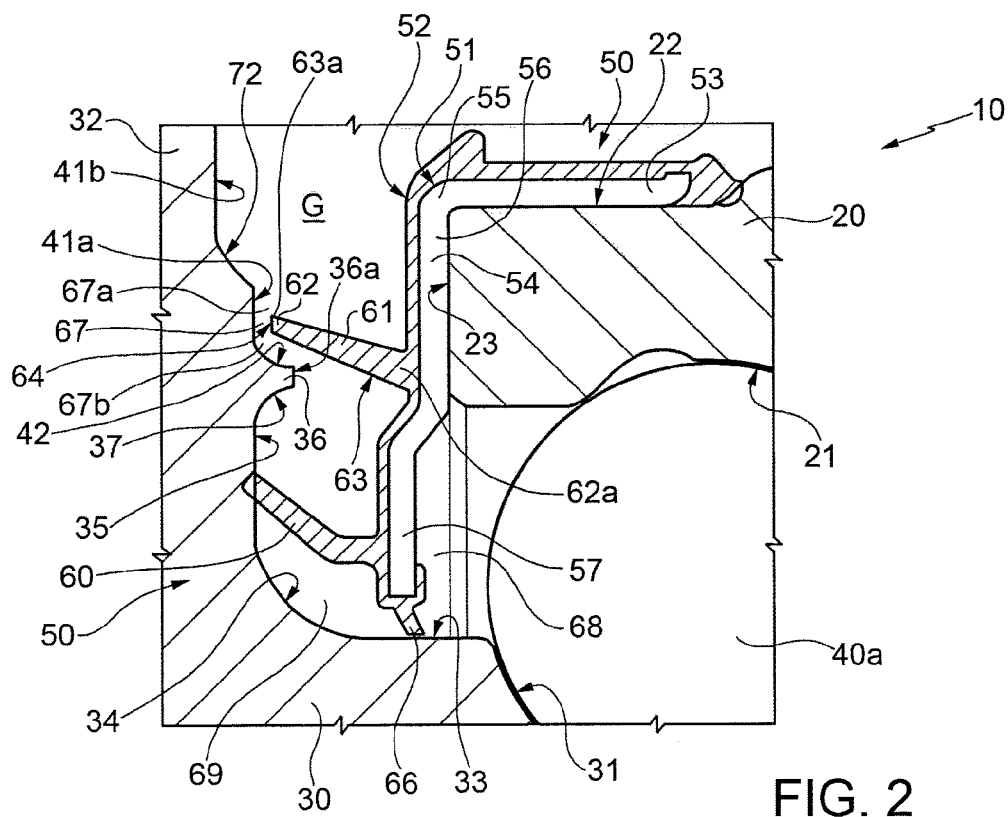
FIG. 2 is an enlarged view of part of the assembly of FIG. 1.

With reference to FIGS. 1 and 2, a hub-bearing assembly, illustrated only partially in the drawings and indicated as a whole by the number 10, is designed to mount a wheel (not shown) rotatably on a vehicle. The assembly 10 has a central axis of rotation x and comprises an outer bearing ring 20, an inner bearing ring 30, and two rows of rolling elements 40a and 40b, which in this example are balls, interposed between the outer ring 20 and the inner ring 30 in a known configuration which it is unnecessary to describe in further detail here.

The outer ring 20 is a stationary ring which can be fastened to the vehicle suspension and which has at least one radially outer raceway 21 formed on a radially inner surface of said ring. Throughout the present description and the claims, any terms and expressions indicating positions and directions, such as "radial" and "axial", are to be understood as relating to the axis of rotation x of the hub-bearing assembly.

The inner ring 30 is a rotating ring, which has a radially inner raceway 31 placed in a coaxially inner position with respect to the raceway 21. The inner ring 30 forms a flange 32 which extends radially outwards from the outboard side, in other words from the axially outer side of the vehicle. The flange 32 is provided with a plurality of threaded holes 11 formed axially through the flange 32 to accommodate corresponding screws for mounting the vehicle wheel.

Between the flange 32 and the outer ring 20 of the bearing there is created a gap G which has to be sealed hermetically, to prevent contaminants such as water, dust and mud from penetrating into the inner parts of the bearing and damaging the surfaces on which the rolling elements 40 roll. For this purpose, the assembly 10 comprises a sealing device 50, which is mounted on the outer ring 20 of the bearing and has a plurality of sealing lips extending towards the rotatable inner ring 30, as described below.

The sealing device 50 comprises a metal insert 51 of annular shape which is fixed to an end portion of the outer ring 20 facing towards the flange 32, and an annular gasket 52 of elastomeric material, made integral with the metal insert 51, by vulcanization for example. The gasket 52 is shown in a non-deformed condition.

The metal insert 51 substantially has an overall L-shape in axial cross-section, this shape being preferably formed by folding and shearing a sheet steel element, and comprises a cylindrical portion 53, which is force-fitted by radial interference around a cylindrical surface 22 of the end portion of the outer ring 20, and a substantially radial portion 54, in the form of a shaped disc, extending radially inwards from an end portion 55 of the cylindrical portion 53.

A radially outermost length 56 of the disc-like or radial portion 54 is arranged abutting against a radial surface 23 of the outer ring 20; a second, radially innermost length 57 projects in a radially inward direction beyond the outer ring 20, extending towards the rotatable inner ring 30 of the hub-bearing assembly.

The rotatable flanged ring 30 has a cylindrical axial surface 33 which is adjacent to the raceway 31, faces in a radially outward direction, and is joined to a radial surface portion 35 of the flange 32 by means of a toroidal surface portion 34, located at the base of the flange 32 on the axially inner side.

The radial surface portion 35 of the flange 32 is positioned transversely to the axis of rotation x in a position axially facing the sealing device 50.

The flange 32 forms an annular relief 36 which protrudes from the surface 35 in an axially inward direction and has a radially inner surface 37 of toroidal shape, facing towards the axis of rotation x, and a radially outer surface 42, also of toroidal shape, but facing in a radially opposite direction to the axis of rotation x.

The annular relief 36 is also axially delimited by an end surface 36a which is substantially radial or transversal to the axis of rotation x, and which faces the axially inner parts of the bearing and provides a connection to the surface 37 and 42 with which it forms corresponding sharp edges having a droplet breaking function.

The flange 32 also has, on its axially inner side, two radial surface portions 41a and 41b which are transverse to the axis of rotation x and are placed in sequence in a position radially outside the annular relief 36; the latter is joined to the radial surface 41a by means of the radially outer surface 42, while the two radial surface portions 41a and 41b are interconnected by a further radially outer surface 72 of toroidal shape which faces in a radially opposite direction to the axis of rotation x.

The gasket 52 comprises:
  a contacting axial lip 60 extending axially from a radially inner end portion 58 of the seal and slidingly contacting the toroidal surface 34 or the radial surface 35 of the flange 32;
  a non-contacting radial lip 66 extending from the radially inner end towards the cylindrical surface 33; and
  a non-contacting axial lip 61 extending towards the flange 32 and having a free end portion 62 which creates a labyrinth seal, without contact, with the flange 32, and a root portion 62a, which substantially contacts the disc-like portion 54 and is substantially positioned on the same diameter as the relief 36.

The free end portion 62 extends from the root portion 62a, being positioned further radially outwards than the root portion 62a itself, and it has a radial surface 64 facing, and substantially parallel to, the surface 41a, and a trunco-conical surface 63, extending axially and coaxially facing the outside of the surface 42 of the relief 36, so as to interact with the surface 42 and with the surface 41a to form a particularly effective labyrinth seal.

The position of the free end portion 62 relative to the surfaces 42 and 41a is advantageous in that it creates, between these two surfaces 42 and 41a and the corresponding surfaces 63 and 64, a gap 67 of particularly sinuous shape which enhances the labyrinth sealing effect and makes it particularly difficult for contaminants such as water, dust or mud to penetrate beyond the lip 61. In particular, the gap 67 extends about the axis of rotation x and is formed by an inlet portion 67a, which is radially elongate and is axially delimited by the surfaces 41a and 64, and by a trunco-conical outlet portion 67b, which is elongate in an axial direction and is delimited radially by the surfaces 42 and 63.

Additionally, the free end portion 62 has a radially outer trunco-conical surface 63a, extending axially and substantially parallel to the surface 63. In a preferred embodiment of the present sealing device 50, the surface 63a is positioned relative to the surface 72, which forms a connection between the radial surfaces 41a and 41b, so as to define a natural continuation of the surface 72. When the inner ring 30 rotates relative to the outer ring 20, the toroidal shape of the surface 72 facilitates the expulsion of water even before the latter reaches the area of the lip 61, and any water or contaminant that has not been expelled is discharged on to the surface 63a and from there is discharged to the outside of the assembly 10. The contacting lip 60 forms a further barrier to contaminants.

Additionally, the non-contacting radial lip 66 defines two chambers 68 and 69, of which the first chamber 68 is located inside the bearing and the second chamber 69 is delimited by the two lips 60, 61 and by the surfaces 34, 35 of the flange 32. The two chambers 68, 69 can be filled with lubricant grease which may of different types; the radial lip 66 prevents the contact and mixing of the two different types of grease.

The surfaces of the ring 30 and of the flange 32 not subjected to the sliding of the lips of the sealing device do not require a particularly high degree of mechanical finish to minimize their surface roughness. The surfaces 34 and 35 of the flange are the only surfaces forming a rotating interface on which lips of the seal slide. These surfaces may be subjected to grinding treatment, for example. The other surfaces of the flange 32, facing towards the axial inner side (or inboard side), do not require a particularly high level of finish, since no sliding contact is made with them. The surfaces 41a, 41b of the flange 32 and the surfaces 37 and 42 of the relief 36 can therefore be simply machined rather than also being ground. It will be appreciated that the assembly does not require a traditional shield forming a rotating sliding counter-face (known as a slinger ring). This eliminates one component and the corresponding costs of production and assembly.

Owing to the presence of a single contacting or sliding lip, the friction due to sliding is reduced to a minimum.

It is to be understood that the invention is not limited to the embodiments described and illustrated herein, which are to be considered as examples of embodiment of the hub-bearing assembly for rotatably mounting a wheel on a vehicle, which can be additionally modified in respect of the forms and arrangements of parts and details of construction and assembly.

The invention claimed is:

1. A hub-bearing assembly for rotatably mounting a wheel to a vehicle, the assembly having an axis of rotation and comprising:
  a radially outer, stationary bearing ring;
  a radially inner bearing ring, rotatable about the axis of rotation and providing a flange extending in a radially outer direction for mounting a wheel;
  a plurality of rolling elements interposed between the outer and inner rings; and
  a sealing device, mounted to the radially outer, stationary bearing ring and having a plurality of elastomeric sealing lips extending towards the radially inner bearing ring,
  wherein the flange forms an annular relief projecting in an axially inner direction, the annular relief having a radially outer surface facing away from the axis of rotation, a radially inner surface facing towards the axis of rotation, and an end surface connecting the radially outer surface with the radially inner surface, the radially outer surface having a toroidal
  shape that terminates at the end surface, wherein the entire radially outer surfaces has the toroidal shape, and
  wherein at least one of the elastomeric sealing lips of the sealing device is a non-contacting axial lip that extends axially towards the flange and provides a free end portion which forms a labyrinth seal with the radially outer surface of the annular relief without contacting the annular relief.

2. The hub-bearing assembly according to claim 1, wherein the free end portion includes a surface that faces the radially outer surface of the annular relief.

3. The hub-bearing assembly according to claim 2, wherein the radially inner bearing ring forms a raceway adjacent to a base portion of the flange having a first toroidal surface portion and a first radial surface portion adjoined to the first toroidal surface portion,
wherein the sealing device provides only a single elastomeric sealing contacting lip in contact with the radially inner bearing ring, wherein the single elastomeric sealing contacting lip slidingly contacts the first toroidal surface portion or the first radial surface portion, and
wherein the first toroidal surface portion and the first radial surface portion are ground.

4. The hub-bearing assembly according to claim 3, wherein the flange has a second radial surface portion formed on an axially inner side of the flange at a radially outer position with respect to the annular relief.

5. The hub-bearing assembly according to claim 4, wherein the flange has a third radial surface portion formed on an axially inner side of the flange at a radially outer position with respect both to the annular relief and to the second radial surface portion, the second radial surface portion adjoining the third radial surface portion by means of a second toroidal surface.

6. The hub-bearing assembly according to claim 5, wherein the free end portion of the non-contacting axial lip forms, with the second radial surface portion and with the annular relief, a sinuous annular gap which forms the labyrinth seal.

7. The hub-bearing assembly according to claim 6, wherein the annular relief protrudes in an axially inner direction beyond the free end portion of the non-contacting axial lip.

8. The hub-bearing assembly according to claim 4, wherein the toroidal shape of the radially outer surface extends from the second radial surface portion to the end surface of the annular relief.

9. The hub-bearing assembly according to claim 3, wherein the single elastomeric sealing contacting lip contacts the first radial surface portion at a location between the radially inner surface of the annular relief and the first toroidal surface portion.

10. The hub-bearing assembly according to claim 3, wherein the radially inner bearing ring further includes a cylindrical surface adjoined to the first toroidal surface portion, and wherein the sealing device further includes a radial lip extending towards the cylindrical surface without contacting the cylindrical surface.

11. The hub-bearing assembly according to claim 3, wherein the radially inner surface of the annular relief has a toroidal shape that extends from the first radial surface portion to the end surface of the annular relief.

12. The hub-bearing assembly according to claim 1, wherein the radially inner surface of the annular relief has a toroidal shape that terminates at the end surface.

13. The hub-bearing assembly according to claim 12, wherein the entire radially inner surface has a toroidal shape.

14. The hub-bearing assembly according to claim 1, wherein plurality of elastomeric sealing lips includes only one sealing lip that contacts the radially inner bearing ring.

15. The hub-bearing assembly according to claim 14, wherein the annular relief is positioned between the non-contacting axial lip and the one sealing lip that contacts the radially inner bearing ring.

16. The hub-bearing assembly according to claim 15, wherein the radially inner surface of the annular relief faces toward the one sealing lip that contacts the radially inner bearing ring.

* * * * *